(12) United States Patent
Rosensteel

(10) Patent No.: US 12,084,269 B2
(45) Date of Patent: Sep. 10, 2024

(54) BIODEGRADABLE AND COMPOSTABLE DOG WASTE MATERIALS AND METHOD FOR USING SAME

(71) Applicant: Inizio Entertainment, LLC—Pooch Paper, St. Charles, IL (US)

(72) Inventor: Patricia Anne Rosensteel, New York, NY (US)

(73) Assignee: INIZIO ENTERTAINMENT, LLC—POOCH PAPER, St. Charles, IL (US)

( * ) Notice: Subject to any disclaimer, the term of this patent is extended or adjusted under 35 U.S.C. 154(b) by 853 days.

(21) Appl. No.: 17/275,882

(22) PCT Filed: Sep. 12, 2019

(86) PCT No.: PCT/US2019/050722
§ 371 (c)(1),
(2) Date: Mar. 12, 2021

(87) PCT Pub. No.: WO2020/056075
PCT Pub. Date: Mar. 19, 2020

(65) Prior Publication Data
US 2021/0284440 A1  Sep. 16, 2021

Related U.S. Application Data

(60) Provisional application No. 62/730,826, filed on Sep. 13, 2018.

(51) Int. Cl.
*B65F 1/00* (2006.01)
*A01K 23/00* (2006.01)
(Continued)

(52) U.S. Cl.
CPC .......... *B65F 1/0006* (2013.01); *A01K 23/005* (2013.01); *D21H 17/22* (2013.01);
(Continued)

(58) Field of Classification Search
CPC ........ D21H 19/50; D21H 19/84; D21H 21/16; D21H 17/21; D21H 19/00; D21H 27/00;
(Continued)

(56) References Cited

U.S. PATENT DOCUMENTS 5,964,488 A * 10/1999 Bedel .................... E01H 1/1206
294/1.3
7,976,083 B2 * 7/2011 Black .................... E01H 1/1206
294/1.3

(Continued)

FOREIGN PATENT DOCUMENTS

GB          2 250 677 A      6/1992

OTHER PUBLICATIONS

Biodegradable or Compostable: What's the Difference?, https://elevatepackaging.com/blog/biodegradable-vs-compostable#:~:text=All%20compostable%20products%20are%20biodegradable%2C%20but%20biodegradable%20products%20are%20not,anything%20harmful%20into%20the%20environment. (Year: 2023).*

(Continued)

*Primary Examiner* — Stephen A Vu
(74) *Attorney, Agent, or Firm* — Patzik, Frank & Samotny Ltd.

(57) ABSTRACT

A biodegradable and compostable sheet of material for picking up and disposing of dog excrement in an environmentally friendly manner. The sheet comprises paper or paperboard that is made grease resistant. The sheets may be stored in individual sheets or on an elongated sheet that may be folded and rolled for use with dispensing units.

In operation, a user grabs or tears off an individual sheet and then places the sheet over the dog excrement so that it is located generally about the sheet's center. The corners or top edges of the sheet may then be grasped and rotated in a direction opposite of the rotation of the central section so (Continued)

that a twist end is formed to retain the dog excrement within a sack. The sack may then be disposed of in a trash can or composter, wherein it will degrade in an environmental safe way.

18 Claims, 3 Drawing Sheets

(51) Int. Cl.
  *D21H 17/22* (2006.01)
  *D21H 19/10* (2006.01)
  *D21H 19/50* (2006.01)
  *D21H 19/84* (2006.01)
  *D21H 21/16* (2006.01)
(52) U.S. Cl.
  CPC ............ *D21H 19/10* (2013.01); *D21H 19/50* (2013.01); *D21H 19/84* (2013.01); *D21H 21/16* (2013.01); *B65F 2240/136* (2013.01)
(58) Field of Classification Search
  CPC .. D21H 17/22; D21H 19/10; B65F 2240/136; B65F 1/0006; B32B 3/266; B32B 9/02; B32B 2250/03; B32B 2307/70; B32B 2307/7163; B32B 29/002; B32B 9/06; B32B 2250/40; E01H 2001/126; E01H 1/1206; A01K 23/005
  See application file for complete search history.

(56) References Cited

U.S. PATENT DOCUMENTS

| | | | |
|---|---|---|---|
| 8,042,489 | B2 | 10/2011 | Takahashi et al. |
| 8,708,381 | B2* | 4/2014 | Chongtoua ............ B65D 81/36 294/1.3 |
| 9,506,209 | B2* | 11/2016 | Schneider ............. E01H 1/1206 |
| 10,487,466 | B1* | 11/2019 | Belter ................... E01H 1/1206 |
| 2005/0279290 | A1 | 6/2005 | Hyland |
| 2007/0042146 | A1 | 2/2007 | Sharp |
| 2010/0303981 | A1 | 12/2010 | Murphy |
| 2015/0176233 | A1 | 6/2015 | Luhrs |
| 2016/0345786 | A1 | 12/2016 | Olson et al. |
| 2017/0073913 | A1 | 3/2017 | Patel |
| 2017/0166371 | A1 | 6/2017 | Sumera |

OTHER PUBLICATIONS

UK Examination Report Issued Feb. 24, 2022 in counter-part UK Patent Application No. 2104014.2.
Search Report and Written Opinion issued Nov. 13, 2019 in PCT/US2019/050722.

* cited by examiner

BIODEGRADABLE AND COMPOSTABLE DOG WASTE MATERIALS AND METHOD FOR USING SAME

This application claims benefit to U.S. Provisional Patent Application Ser. No. 62/730,826, filed Sep. 13, 2018, the entirety of which is hereby incorporated by reference.

FIELD OF THE INVENTION

This invention relates generally to biodegradable and compostable materials and more particular to biodegradable and compostable materials that may be utilized for picking up and disposing of dog or other animals waste in an environmentally friendly manner.

BACKGROUND OF THE INVENTION

Most people are familiar with the adage that dogs are man's best friend. To that effect, in the United States alone, there are an estimated 78,000,000 dogs. Considering each dog produces, on average, three-fourths of a pound of excrement a day, that amounts to around 213,000,000,000 pounds of dog waste each year.

While some people utilize dog waste for composting, because of the bacteria and other pathogens found therein, it is generally only recommended to do so if you can regulate the temperature during composting to kill off those bacteria and pathogens. In most climates, this is not possible or practical for the average person. Accordingly, a large amount of waste is thrown in the garbage and winds up at landfills, often in larger plastic bags (e.g., from retailers) or small plastic dog waste bags because of their prevalence and lower cost. In fact, it is estimated that pet owners use more than 500,000,000 plastic bags for dog waste annually.

Use of such plastics creates many environmental concerns. First, plastic is generally not bio-degradable—it can take over 500 years to degrade, if it ever degrades. Some companies have introduced what they purport to be plastic-like biodegradable or compostable waste bags; however, a number of these claims have been found to be deceptive by the Federal Trade Commission. Other bags are manufactured as "oxo-biodegradables", meaning that a chemical element is added in the manufacturing process to enable the plastic to break down quicker. However, oxo-biodegradable often do not fully degrade. Instead, they are broken down into millions of tiny micro-plastic particles that enter the air we breathe. Such micro-plastic particles may, among other things, carry toxic or carcinogenic chemicals used in making the plastic or they can act as a carrier for pathogens or heavy metals.

Second, the combination of the plastic, waste and other compressed garbage at landfills results in the emission of methane gas into the air, which as a greenhouse gas, can absorb the sun's heat, thereby warming the atmosphere and adversely affecting the climate. The release of large quantities of methane gas is especially problematic in that studies have shown that in the initial years after its release, methane can be about 84 times more potent than carbon dioxide.

BRIEF SUMMARY OF THE INVENTION

The present invention comprises a biodegradable and compostable sheet of material that may be utilized to pick up and dispose of dog excrement in an environmentally friendly manner. The sheet is made of a paper or paperboard material that is made grease resistant to prevent the excrement or any associated liquid from seeping through the sheet during use. The sheets may be stored in individual sheets or on an elongated sheet that may be torn off as needed. The elongated sheet may include perforations or other weakened areas to facilitate the removal of individual sheets during use. In order to be used in known dog waste container dispensers, the elongated sheets may be folded over atop itself a number of times and tightly rolled.

In operation, a user selects a sheet by grabbing an individual sheet or tearing a sheet off of the elongated sheet and then places the central area of the sheet over the dog excrement. The user may then pick up the dog excrement by grasping it with his or her hands about the sheet and forming a pocket. Once the dog excrement is picked up, the user grasps the corners or about the top edges of the sheet and rotates them in a direction opposite of the rotation of the central section so that a twist end is formed to retain the dog excrement within a central sack. The sack may then be disposed of in a trash can or composter, wherein it will degrade in an environmental safe way.

Accordingly, it is an object of the present invention to provide a material for collecting and disposing of dog waste that is biodegradable and compostable.

Yet another object of the present invention is to provide a material for collecting and disposing of dog waste that is economical and easy to manufacture.

Still another object of the present invention is to provide a material for collecting and disposing of dog waste that is easy and efficient to use.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
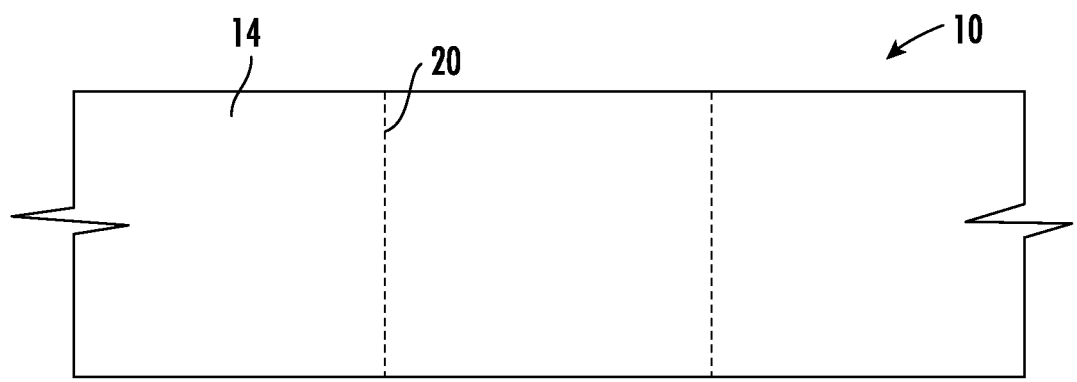
FIG. 1 is top view of one embodiment of the present invention in elongated sheet form.
Figure 2:
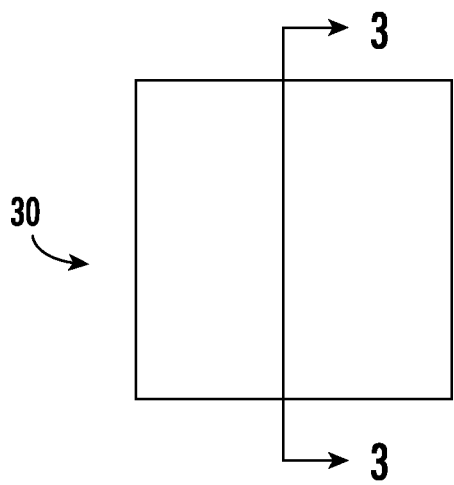
FIG. 2 is a top view of one embodiment of an individual sheet of the present invention.
Figure 3:
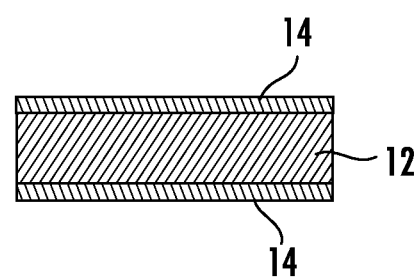
FIG. 3 is a cross-sectional view of the sheet of FIG. 2.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

FIG. 1 shows one embodiment of the present invention in the form of an elongated sheet 10. While it is appreciated that the width of the sheets may be of a variety of sizes sufficient to allow for the collection and disposal of dog excrement, preferred embodiments may utilize a width of 12 or 15 inches. The length of the elongated sheet may be a variety of lengths, but is preferred to be between about 12 and 15 feet to allow it to be rolled and stored in known dispensing units (not shown).

The material for the sheet is biodegradable and compostable. In one embodiment, the material may be a paper or paperboard product 12 coated with a biodegradable grease resistant layer 14. The paper layer may be made from a variety of materials including but not limited to, Kraft paper or recycled, unbleached sheets made from a softwood pulp. The grease resistant coating may be made from a variety of biodegradable materials including proteins or corn. The grease resistant coating may be utilized on the contact side of the paper to prevent any liquids or other materials from the dog excrement from seeping through the paper onto a consumer's hand. It is also appreciated that both the contact side and grasping side of the paper may be coated with the grease resistant layer. Using a corn or protein grease resistant layer allows the entire sheet to still be biodegradable and compostable, but strong enough for efficient and clean use of the product to collect dog excrement.

It is also appreciated that the paperboard product may be made grease resistant through the manufacturing process. For example, use of a Yankee dryer or other pressure vessel can remove moisture from paper pulp or the paper product to make the finished paper product more resistant to liquids or grease seeping therethrough. An example of a paper product having grease resistant properties formed using a pressure vessel is Acadia Natural manufactured by Twin Rivers Paper Company.

Referring again to FIG. 1, the elongated sheet 10 may be divided into individual smaller sheets 30 through perforations or other weakened areas 20. Alternatively, the elongated sheet 10 may have no perforations or weakened areas and simply be torn at desired lengths. In order to facilitate the twisting and storage processes, the individual sheets are preferably squares, but may be rectangular if desired. It also is appreciated that the individual sheets may be stored in stacked form similar to a ream of paper for individual use.

Figure 4:
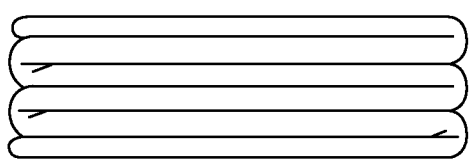
FIG. 4. is a side elevation view of the elongated sheet in FIG. 1 in folded form.
Figure 5:
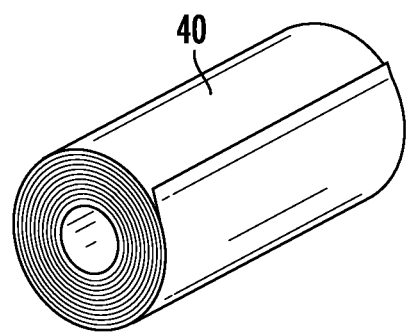
FIG. 5 is a perspective view of folded elongated sheet from FIG. 4 in rolled form.

The elongated sheet 10 may be folded and rolled into a condensed roll 40 for use in connection with known dog waste collector dispensing units (not shown). In one embodiment, as shown in FIG. 4, an elongated sheet having a width of 12 inches is folded over onto itself 5 times, resulting in a six-layer sheet having a width of about 2 inches.

Figure 6:
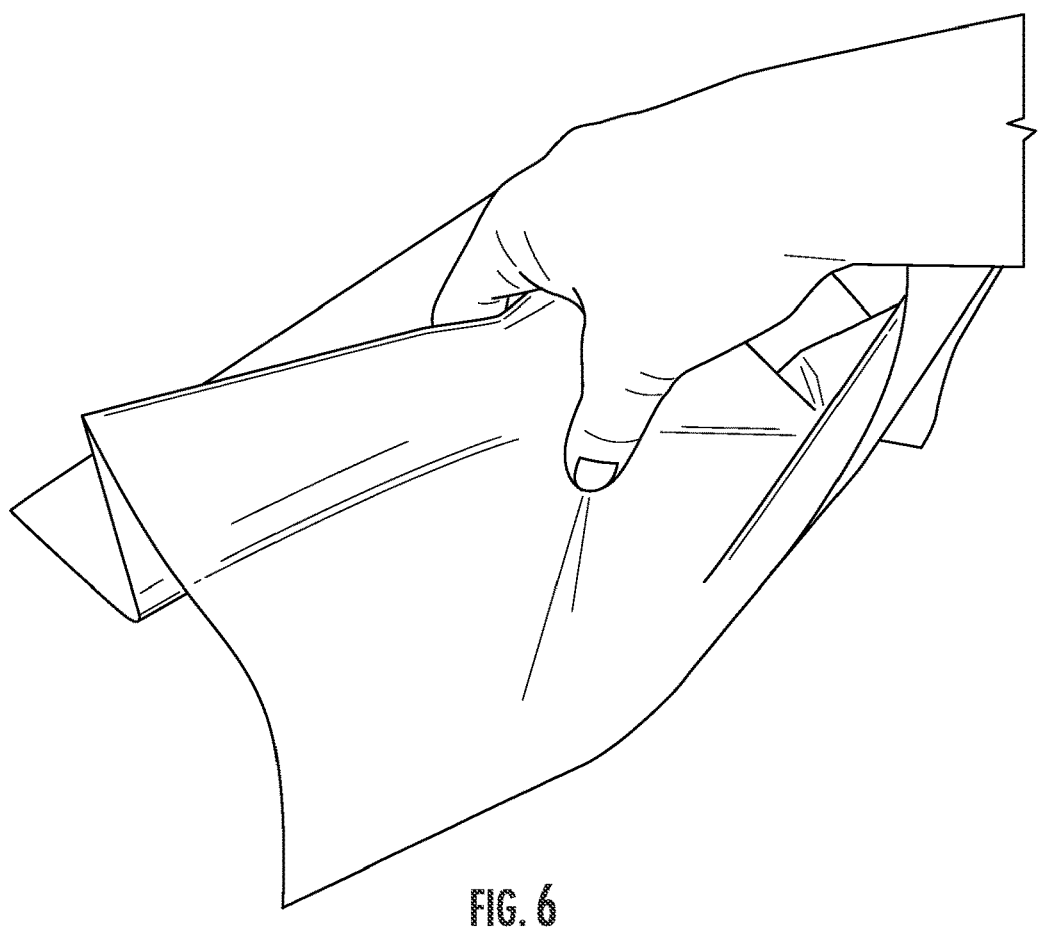
FIG. 6 is a perspective view illustrating the use of the present invention to pick up dog waste.
Figure 7:
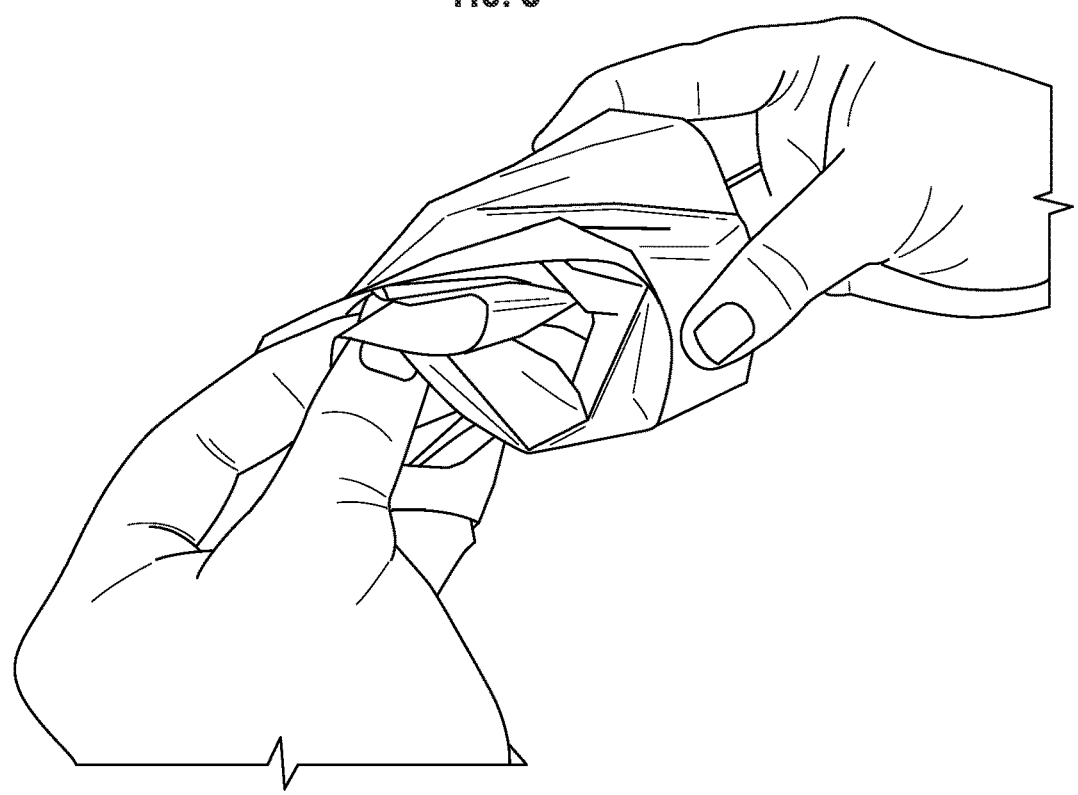
FIG. 7 is a perspective view illustrating the twisting of the sheet from FIG. 6.
Figure 8:
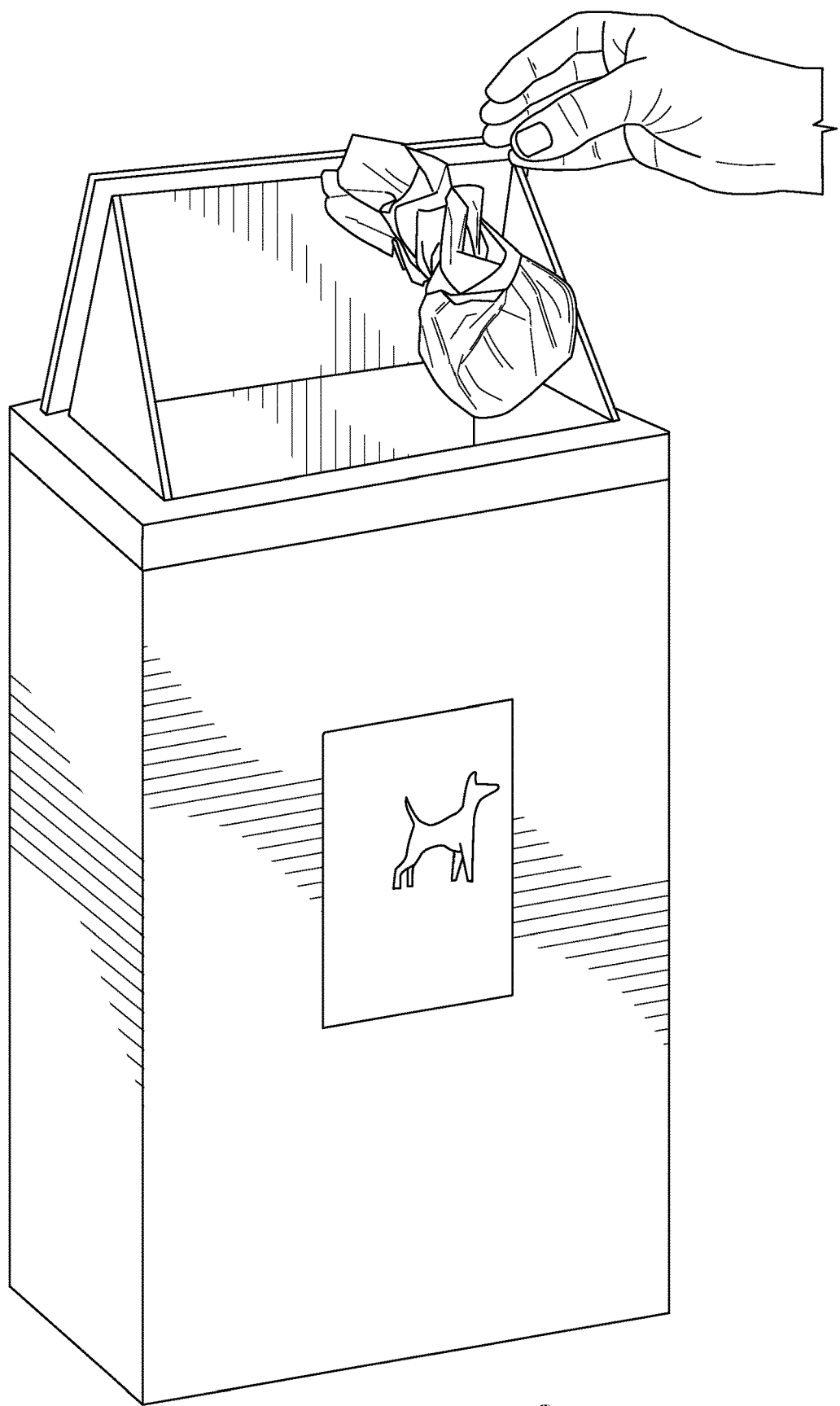
FIG. 8 is a perspective view illustrating the filled twisted sheet of FIG. 7 being thrown away.

In operation, a user pulls on the end of the elongated sheet 10 of material from a dispenser and tears off an individual sheet 30 using perforation 20. As shown in FIG. 6, the user then grasps the sheet around the middle with one fingers extended and spread apart a distance sufficient to encompass the dog excrement. Once all of the dog excrement is picked up and contained within a pocket or sack formed by the user's hand, as shown in FIG. 7, the user may grab the corners or about the edges of the sheet 30 with his or her other hand and rotate or twist his or her hands in opposite directions to form a small sack with the dog excrement therewithin. It is appreciated, that one of the hands may stay relatively stationary while the other hand rotates part of the sheet to form the twist end. Referring to FIG. 8, the sack may then be disposed of in the garbage or composter, wherein both the formed sack and contents will degrade in an environmentally safe way.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

The invention claimed is:

1. A method of disposing of dog waste in an environmentally friendly way comprising the steps of:
grabbing a biodegradable and compostable individual sheet of material comprised of a paper layer having a contact side, a grasping side, and an outer edge portion, the contact side being grease resistant;
grasping the individual sheet of material about a center portion of the grasping side;
placing the individual sheet of material over the dog waste;
grabbing the dog waste with the contact side of the individual sheet of material and forming a pocket surrounding the dog waste;
grabbing the individual sheet of material about the outer edge portion and twisting the pocket and outer edge portion relative to one another to close off the pocket; and
disposing of the individual sheet of material with the dog waste contained within the pocket.

2. The method of claim 1 wherein both the contact side and the grasping side are grease resistant.

3. The method of claim 1 wherein the individual sheet of material is substantially square shaped.

4. The method of claim 1 wherein the step of grabbing the individual sheet of material comprises the step of tearing off the individual sheet of material from an elongated sheet of material.

5. The method of claim 4 wherein the elongated sheet of material has weakened areas for separating the elongated sheet of material into individual sheets of material for use.

6. The method of claim 5 wherein the weakened areas comprise perforations.

7. The method of claim 1 wherein the paper layer comprises a kraft paper.

8. The method of claim 1 wherein the paper layer comprises unbleached softwood pulp.

9. A method of manufacturing a sheet of biodegradable, compostable and grease-resistant material for picking up and disposing of dog waste in an environmentally friendly way comprising the steps:
providing a biodegradable and compostable paper pulp;
removing moisture from the paper pulp;
forming an elongated sheet of grease-resistant, biodegradable and compostable paper from the paper pulp; and
cutting the elongated sheet of paper into smaller sheets of paper.

10. The method of claim 9 wherein the smaller sheets of paper are individual squares of paper for picking up and disposing of dog waste.

11. The method of claim 9 wherein the smaller sheets of paper are smaller elongated sheets of paper for forming rolls of individual sheets of paper.

12. The method of claim 11 which further comprises the step of forming weakened areas along the smaller elongated sheets of paper for separating the smaller elongated sheets of paper into the individual sheets of paper for use.

13. The method of claim 12 wherein the individual sheets of paper are substantially square shaped.

14. The method of claim 12 wherein the weakened areas comprise perforations.

15. The method of claim 9 wherein the step of forming an elongated sheet comprises the step of applying a grease resistant layer to the elongated sheet.

16. The method of claim 15 wherein the grease resistant layer comprises a coating comprising corn.

17. The method of claim 15 wherein the grease resistant layer comprises a coating comprising protein.

18. The method of claim 9 wherein the paper pulp comprises unbleached softwood pulp.

* * * * *